(12) United States Patent
Chen et al.

(10) Patent No.: US 12,309,791 B2
(45) Date of Patent: May 20, 2025

(54) METHOD AND DEVICE FOR TRANSMITTING UPLINK SIGNAL

(71) Applicant: GUANGDONG OPPO MOBILE TELECOMMUNICATIONS CORP., LTD., Dongguan (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 577 days.

(21) Appl. No.: 17/149,645

(22) Filed: Jan. 14, 2021

(65) Prior Publication Data
US 2021/0136739 A1 May 6, 2021

Related U.S. Application Data

(63) Continuation of application No. PCT/CN2018/103366, filed on Aug. 30, 2018.

(51) Int. Cl.
*H04W 72/23* (2023.01)
*H04L 5/00* (2006.01)
*H04W 56/00* (2009.01)

(52) U.S. Cl.
CPC ........... *H04W 72/23* (2023.01); *H04L 5/0048* (2013.01); *H04L 5/0055* (2013.01); *H04W 56/001* (2013.01)

(58) Field of Classification Search
CPC . H04W 72/23; H04W 56/001; H04W 72/046; H04W 72/02; H04W 72/54; H04W 16/28; H04W 72/21; H04W 72/542; H04L 5/0048; H04L 5/0055; H04L 5/0051;
(Continued)

(56) References Cited

U.S. PATENT DOCUMENTS

2003/0169720 A1* 9/2003 Sebastian ............... H04W 88/08
370/441
2012/0294204 A1* 11/2012 Chen ..................... H04L 5/0053
370/280
(Continued)

FOREIGN PATENT DOCUMENTS

| CA | 3038857 A1 * | 4/2018 | ........... H04B 17/364 |
| CA | 3049490 A1 * | 7/2018 | ........... H04B 17/373 |
| CN | 108092754 A * | 5/2018 | ......... H04L 27/2613 |

(Continued)

OTHER PUBLICATIONS

First Office Action issued in corresponding Chinese Patent Application No. 202110265876.9 mailed Apr. 6, 2022, 17 pages.
(Continued)

*Primary Examiner* — Khaled M Kassim
*Assistant Examiner* — Oladiran Gideon Olaleye
(74) *Attorney, Agent, or Firm* — BAYES PLLC

(57) ABSTRACT

A method for transmitting an uplink signal includes receiving, by a terminal device, a downlink signal transmitted by a network device; determining, by the terminal device, spatial relationship information of the uplink signal corresponding to the downlink signal according to at least one TCI state of the downlink signal; and transmitting, by the terminal device, the uplink signal to the network device according to the spatial relationship information.

11 Claims, 3 Drawing Sheets

(58) Field of Classification Search
CPC . H04L 5/0023; H04L 5/0053; H04B 7/06966; H04B 7/0695
USPC .......................................................... 370/329
See application file for complete search history.

(56) References Cited

U.S. PATENT DOCUMENTS

2014/0307816 A1* 10/2014 Alex .................. H04L 25/0202
  375/267
2018/0227094 A1*  8/2018 Liu ..................... H04B 7/06966

FOREIGN PATENT DOCUMENTS

| CN | 108199819 | A | | 6/2018 | |
|---|---|---|---|---|---|
| CN | 108366423 | A | | 8/2018 | |
| WO | WO-2018080363 | A1 | * | 5/2018 | ............ H04J 11/005 |
| WO | WO-2018128376 | A1 | * | 7/2018 | ............... H04B 7/00 |
| WO | WO-2018128520 | A1 | * | 7/2018 | ........... H04B 7/0408 |
| WO | WO-2018129300 | A1 | * | 7/2018 | ........... H04B 7/0695 |
| WO | 2018137367 | A1 | | 8/2018 | |
| WO | 2020042123 | A1 | | 3/2020 | |

OTHER PUBLICATIONS

Second Office Action issued in corresponding Chinese Patent Application No. 202110265876.9 mailed Jun. 23, 2022, 19 pages.
"LDPC Coding Issues", Source: Ericsson, 3GPP TSG RAN WG1 Meeting AH 1801, R1-1800214, Vancouver, Canada, Jan. 22-26, 2018, 5 pages.
First Office action issued in corresponding India Patent Application No. 202117002103 mailed Jan. 10, 2022, 5 pages.
PCT Written Opinion of the International Searching Authority issued in corresponding International Application No. PCT/CN2018/103366, mailed on Apr. 30, 2019, 7 pages.
"3rd Generation Partnership Project; Technical Specification Group Radio Access Network; NR; Physical layer procedures for data" (Release 16); 3GPP TS 38.214 V16.3.0 (Sep. 2020), 165 pages.
"Remaining details on beam management", Source: Ericsson, Agenda Item: 7.2.2.3, 3GPP TSG RAN WG1 Meeting AH 180, R1-1800699, Vancouver, Canada, Jan. 22-26, 2018, 5 pages.
"3rd Generation Partnership Project; Technical Specification Group Radio Access Network; NR; Physical layer procedures for control" (Release 16); 3GPP TS 38.213 V16.3.0 (Sep. 2020), 179 pages.
Extended European Search Report issued in corresponding European Patent Application No. 18931854.6, mailed Jun. 21, 2021, 10 pages.
"Feature lead summary 3 of beam measurement and reporting", Agenda: 7.2.2.3, Source: Ericsson, 3GPP TSG RAN WG1 Meeting AH 1801, R1-1801187, Vancouver, Canada, Jan. 22-26, 2018, 13 pages.
"Remaining details on beam measurement and reporting", Agenda Item: 7.2.2.3, Source: vivo, 3GPP TSG RAN WG1 Meeting #91, R1-1719769, Reno, USA, Nov. 27-Dec. 1, 2017, 8 pages.
"Remaining details on beam management", Agenda Item: 7.2.2.3, Source: CATT, 3GPP TSG RAN WG1 Meeting AH 1801, R1-1800241, Vancouver, Canada, Jan. 22-26, 2018, 3 pages.

* cited by examiner

METHOD AND DEVICE FOR TRANSMITTING UPLINK SIGNAL

CROSS-REFERENCE TO RELATED APPLICATION

This application is a continuation application of International Application No. PCT/CN2018/103366, entitled "METHOD AND DEVICE FOR TRANSMITTING UPLINK SIGNAL," filed on Aug. 30, 2018, the content of which is incorporated herein by reference in its entirety.

BACKGROUND

The present disclosure relates to the field of communications, and particularly to a method and device for transmitting an uplink signal.

In a new radio (NR) system, a network device can independently transmit downlink signals to a terminal device by using one or more transmission/reception points (TRPs) or antenna panels, and when the terminal device transmits uplink signals corresponding to the downlink signals to the network device, it needs to transmit the uplink signals to the TRPs or antenna panels from which the downlink signals are transmitted. How to transmit the uplink signals to ensure communication quality is an urgent problem to be solved.

SUMMARY

The embodiments of the present disclosure provide a method and device for transmitting an uplink signal.

According to a first aspect, there is provided a method for transmitting an uplink signal, including receiving, by a terminal device, a downlink signal transmitted by a network device; determining, by the terminal device, spatial relationship information of an uplink signal corresponding to the downlink signal according to at least one TCI state of the downlink signal; and transmitting, by the terminal device, the uplink signal corresponding to the downlink signal to the network device according to the spatial relationship information.

According to a second aspect, there is provided a method for transmitting an uplink signal, including transmitting, by a network device, a downlink signal to a terminal device; determining, by the network device, spatial relationship information of an uplink signal corresponding to the downlink signal according to at least one TCI state of the downlink signal; and receiving, by the network device, the uplink signal corresponding to the downlink signal transmitted by the terminal device according to the spatial relationship information.

According to a third aspect, there is provided a terminal device that is configured to perform the method in the above first aspect or the implementations thereof.

Specifically, the terminal device includes functional modules configured to perform the method in the above first aspect or the implementations thereof.

According to a fourth aspect, there is provided a network device configured to perform the method in the above second aspect or the implementations thereof.

Specifically, the network device includes functional modules configured to perform the method in the above second aspect or the implementations thereof.

According to a fifth aspect, there is provided a terminal device including a processor and a memory. The memory is used for storing a computer program, and the processor is configured to invoke and run the computer program stored in the memory to perform the method in the above first aspect or the implementations thereof.

According to a sixth aspect, there is provided a network device including a processor and a memory. The memory is used for storing a computer program, and the processor is configured to invoke and run the computer program stored in the memory to perform the method in the above second aspect or the implementations thereof.

According to a seventh aspect, there is provided a chip which is used to carry out the method in any one of the above first to second aspects or the implementations thereof.

Specifically, the chip includes a processor configured to invoke and run a computer program from a memory, so that a device installed with the chip performs the method in any one of the above first to the second aspects or the implementations thereof.

According to an eighth aspect, there is provided a computer-readable storage medium for storing a computer program that causes a computer to perform the method in any one of the above first to the second aspects or the implementations thereof.

According to a ninth aspect, there is provided a computer program product including computer program instructions that cause a computer to perform the method in any one of the above first to the second aspects or the implementations thereof.

According to a tenth aspect, there is provided a computer program which, when running on a computer, causes the computer to perform the method in any one of the above first to the second aspects or the implementations thereof.

DETAILED DESCRIPTION

The technical solutions in the embodiments of the present disclosure will be clearly and completely described below in conjunction with the drawings in the embodiments of the present disclosure.

The technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, an Universal Mobile Telecommunication System (UMTS), a Worldwide Interoperability for Microwave Access (WiMAX) communication system, a Wireless Local Area Network (WLAN), a Wireless Fidelity (WiFi), a next-generation communication system or other communication systems.

Generally speaking, traditional communication systems support a limited number of connections and are easy to implement. However, with the development of communication technologies, mobile communication systems will not only support traditional communications, but will also support, for example, Device to Device (D2D) communication, machine to machine (M2M) communication, machine type communication (MTC), vehicle to vehicle (V2V) communication, etc. The embodiments of the present disclosure can also be applied to these communications systems.

Optionally, the communication system in the embodiments of the present disclosure can be applied to a carrier aggregation (CA) scenario as well as a dual connectivity (DC) scenario and a standalone (SA) deployment scenario.

Figure 1:
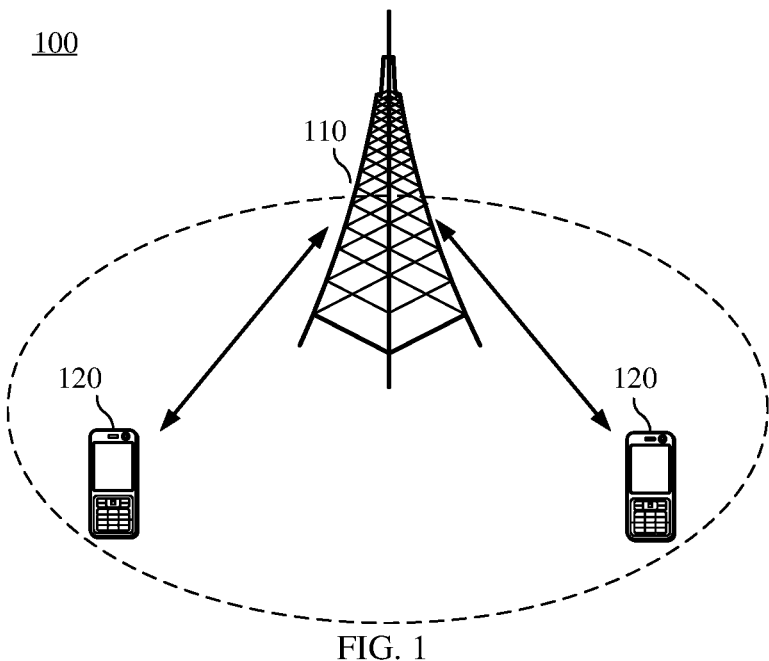
FIG. 1 is a schematic diagram of a communication system architecture according to an embodiment of the present disclosure.

Exemplarily, a communication system 100 to which the embodiments of the present disclosure are applied is shown in FIG. 1. The wireless communication system 100 can include a network device 110. The network device 110 can be a device that communicates with a terminal device. The network device 110 can provide communication coverage for a specific geographic area and can communicate with terminal devices located in the coverage area. Optionally, the network device 110 may be a Base Transceiver Station (BTS) in a GSM system or a CDMA system, a NodeB (NB) in a WCDMA system, an Evolutional Node B (eNB or eNodeB), a network side device in an NR system, or a wireless controller in a Cloud Radio Access Network (CRAN), or the network device can be a relay station, an access point, an in-vehicle device, a wearable device, a network side device in a next-generation network, a network device in future evolutional Public Land Mobile Network (PLMN), or the like.

The wireless communication system 100 also includes at least one terminal device 120 located within the coverage area of the network device 110. As used herein, a "terminal device" includes, but is not limited to, a device which communicates via a wired line connection, such as a public switched telephone networks (PSTN), a digital subscriber line (DSL), a digital cable, and a direct cable connection; via another data connection/network; and/or via a wireless interface, such as those for a cellular network, a wireless local area network (WLAN), a digital TV network such as a DVB-H network, a satellite network or an AM-FM broadcast transmitter; a device of another terminal device that is configured to receive/transmit communication signals; and/or an Internet of Things (IoT) device. The terminal device which is configured to communicate via the wireless interface may be referred to as a "wireless communication terminal," a "wireless terminal," or a "mobile terminal."

The terminal device 120 may be movable or fixed. Optionally, the terminal device 120 may refer to an access terminal, user equipment (UE), a user unit, a user station, a mobile station, a moving station, a remote station, a remote terminal, a mobile device, a user terminal, a terminal, a wireless communication device, a user agent or a user device. The access terminal can be a cellular phone, a cordless phone, a Session Initiation Protocol (SIP) phone, a wireless local loop (WLL) station, a personal digital assistant (PDA), a handheld device with a wireless communication function, a computing device or other processing devices connected to a wireless modem, an on-board device, a wearable device, a terminal device in the future 5G network, a terminal device in a future evolutional PLMN, or the like. Optionally, the D2D communication may also be performed between the terminal devices 120.

Specifically, the network device 110 can provide services for a cell, and the terminal device 120 communicates with the network device 110 through transmission resources (for example, frequency domain resources, or spectrum resources) used by the cell. The cell may be a cell corresponding to the network device 110 (e.g., a cell corresponding to the base station), or belong to a macro base station or a base station corresponding to a small cell. The small cell herein can include a Metro cell, a Micro cell, a Pico cell, a Femto cell, etc., which are characterized in small coverage and low transmission power, and are suitable for providing high-rate data transmission services.

FIG. 1 exemplarily shows one network device and two terminal devices. Optionally, the wireless communication system 100 may include multiple network devices, and other numbers of terminal devices may be included in the coverage of each of the network devices, which are not limited in the embodiments of the present disclosure. Optionally, the wireless communication system 100 may also include other network entities such as a network controller and a mobility management entity, which are not limited in the embodiments of the present disclosure.

Taking the NR system as an example, the network device can configure a corresponding Transmission Configuration Indicator (TCI) state for each downlink signal, and the terminal device can receive the downlink signal based on this configuration.

Optionally, the TCI state may include at least one of an index of a Channel State Information Reference Signal (CSI-RS) resource, an index of a Synchronization Signal Blocks (SSB), and a PTRS port.

The index of the CSI-RS resource may be an identity (ID) of the CSI-RS resource.

Different CSI-RSs can be transmitted by different resources, and different SRSs can also be transmitted by different resources.

Optionally, the terminal device can determine a spatial reception parameter of the downlink signal based on the CSI-RS resource index and/or the SSB index in the TCI state, and the spatial reception parameter can be used for indicating a beam or antenna panel which is used for receiving the downlink signal.

Taking the CSI-RS as an example, the network device can use different beams to transmit multiple CSI-RSs to the terminal device, and the terminal device can report the selected CSI-RS to the network device according to the CSI-RS reception situation.

Optionally, the terminal device may report the CSI-RS resource index for the CSI-RS with the best reception quality to the network device. Alternatively, the terminal device may report the reception quality on at least one CSI-RS resource to the network device, and the reported information includes the index value of the at least one CSI-RS resource and the signal reception quality on the resource.

Thereafter, when transmitting the downlink signals, the network device can configure the TCI state for each downlink signal, and the TCI state includes the index of the CSI-RS resource. The terminal device can assume that a same beam is used for the downlink signal as that for the CSI-RS on the CSI-RS resource, and thus use the same receiving beam as the CSI-RS resource to receive the downlink signal.

Taking the SRS as an example, the terminal device can use different beams to transmit multiple SRSs to the network device, and the network device can transmit SRS resource indication information to the terminal device according to the reception quality of the SRSs, indicating an SRS resource with the best reception quality, so as to cause the terminal device to transmit other subsequent signals by using the beam which is used for transmitting the SRS resource.

In the foregoing, the description is given in which the terminal device determines the beam for receiving the downlink signal according to the at least one TCI state of the downlink signal by taking the beam as an example. The same method applies to the antenna panel.

Taking the CSI-RS as an example, the network device can use different antenna panels to transmit multiple CSI-RSs, and the terminal device can use different antenna panels to receive the CSI-RSs. Thereafter, the network device can indicate an index of a CSI-RS resource in at least one TCI state of the transmitted downlink signal, and the terminal device can determine the antenna panel for receiving the CSI-RS on the CSI-RS resource according to the index of the CSI-RS resource, and use the antenna panel to receive the downlink signal.

Taking the SRS as an example, the terminal device can use different antenna panels to transmit multiple SRSs, and the network device can transmit SRS resource indication information to the terminal device according to the reception quality of the SRSs, indicating an SRS resource with the best reception quality, so as to cause the terminal device to transmit other subsequent signals by using the antenna panels which is used for transmitting the SRS resource.

It should be noted that the beam in the embodiments of the present disclosure may be formed by an antenna panel, and the beam in one direction may be formed by multiple antenna panels, or by one antenna panel. One antenna panel can form one beam in one direction or beams in different directions.

Optionally, the beam in the embodiment of the present disclosure may also be referred to as a spatial domain transmission filter.

If the network device indicates a CSI-RS resource in at least one TCI state of a certain downlink signal, the terminal device can assume that the same beam or antenna panel is used for the downlink signal and the CSI-RS resource, so that the terminal device can receive the downlink signal by using the beam or antenna panel which is used for the CSI-RS resource.

If the network device indicates an SSB index in a certain downlink signal, the terminal device can assume that the same beam or antenna panel is used for the downlink signal and an SSB indicated by the SSB index, so that the terminal device can receive the downlink signal by using the beam which is used for transmitting the SSB.

Take the NR system as an example. The network device can use multiple TRPs, antenna panels, or beams to independently transmit multiple downlink signals to the terminal device, and the terminal device may need to transmit uplink signals corresponding to the downlink signals to the multiple TRPs, antenna panels or beams, respectively. When receiving the downlink signals, the terminal device can use different antenna panels or beams to receive different downlink signals. If the beam or antenna panel used by the terminal device to transmit the uplink signal corresponding to the downlink signal is different from the beam or antenna panel used to receive the downlink signal, the beam used by the terminal device to transmit the uplink signal corresponding to the downlink signal may not be aligned to the corresponding TRP or antenna panel, resulting in poor transmission performance of the uplink signal transmitted to the corresponding TRP or antenna panel.

The embodiments of the present disclosure provide a method and device for transmitting an uplink signal, which can ensure the reliability of uplink transmission by the terminal device.

Figure 2:
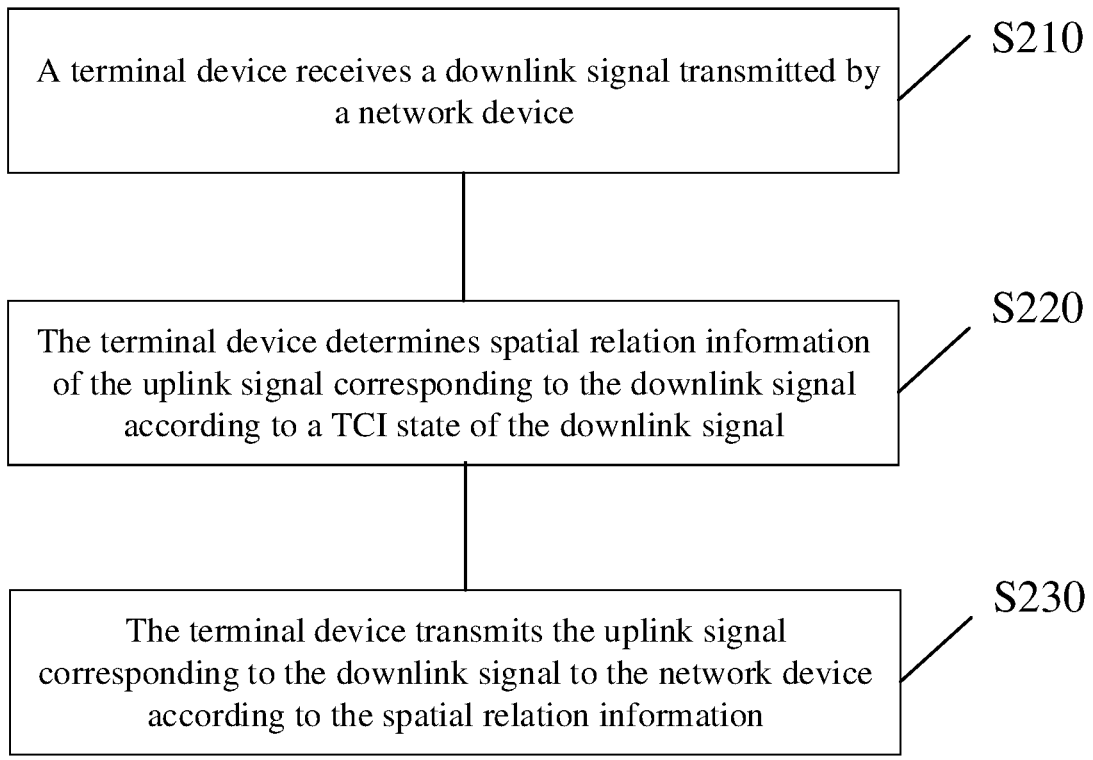
FIG. 2 is a schematic diagram of a method for transmitting an uplink signal according to an embodiment of the present disclosure.

FIG. 2 is a schematic diagram of a method for transmitting an uplink signal according to an embodiment of the present disclosure. The method shown in FIG. 2 includes steps 210-230.

In step 210, a terminal device receives a downlink signal transmitted by a network device.

Optionally, the downlink signal may be at least one of a Physical Downlink Shared Channel (PDSCH), a Physical Downlink Control Channel (PDCCH), a CSI-RS, or the like.

The PDSCH can be used to carry data information or high-level signaling. For example, the PDSCH can be used to transmit data, or to carry Radio Resource Control (RRC) signaling or medium access control (MAC) signaling.

The PDCCH can be used to carry scheduling information or control information. For example, the PDCCH can carry Downlink Control Information (DCI), which can be used to schedule uplink transmission.

When receiving the downlink signal transmitted by the network device, the terminal device can receive the downlink signal according to a TCI state corresponding to the downlink signal.

Optionally, the terminal device can receive the downlink signal according to a CSI-RS resource index and/or an SSB index in at least one TCI state of the downlink signal. The terminal device can receive the downlink signal by using an antenna panel which is used for receiving a CSI-RS resource and/or an SSB indicated by the index, or the terminal device can receive the downlink signal by using a beam which is used for receiving the CSI-RS resource and/or the SSB indicated by the index.

In step 220, the terminal device determines spatial relationship information of the uplink signal corresponding to the downlink signal according to at least one TCI state of the downlink signal.

The spatial relationship information can be used for indicating a beam or antenna panel used for transmitting the uplink signal corresponding to the downlink signal.

Specifically, the terminal device transmits the uplink signal corresponding to the downlink signal by using the antenna panel or beam, which is used for receiving the CSI-RS resource indicated by the CSI-RS resource index or the SSB indicated by the SSB index included in the spatial relationship information.

The uplink signal corresponding to the downlink signal may include at least one of a Physical Uplink Shared Channel (PUSCH), a Physical Uplink Control Channel (PUCCH), and a Sounding Reference Signal (SRS).

In step 230, the terminal device transmits the uplink signal corresponding to the downlink signal to the network device by using the spatial relationship information.

In the technical solutions provided by the embodiments of the present disclosure, the spatial relationship information of the uplink signal corresponding to the downlink signal is determined according to the TCI state of the downlink signal. Since the TCI state of the downlink signal is associated with the TRP or antenna panel which transmits the downlink signal, different TRPs or antenna panels have their own independent TCI states. As such, the spatial relationship information of the uplink signal corresponding to the downlink signal determined by the TCI state of the downlink signal is also associated with the TRP or antenna panel. Therefore, when the terminal device transmits the uplink signal corresponding to the downlink signal based on the spatial relationship information, it can align with the TRP or antenna panel, which transmits the downlink signal and ensure the quality of the signal received by the terminal device through the TRP or antenna panel, thereby ensuring the communication quality.

Figure 3:
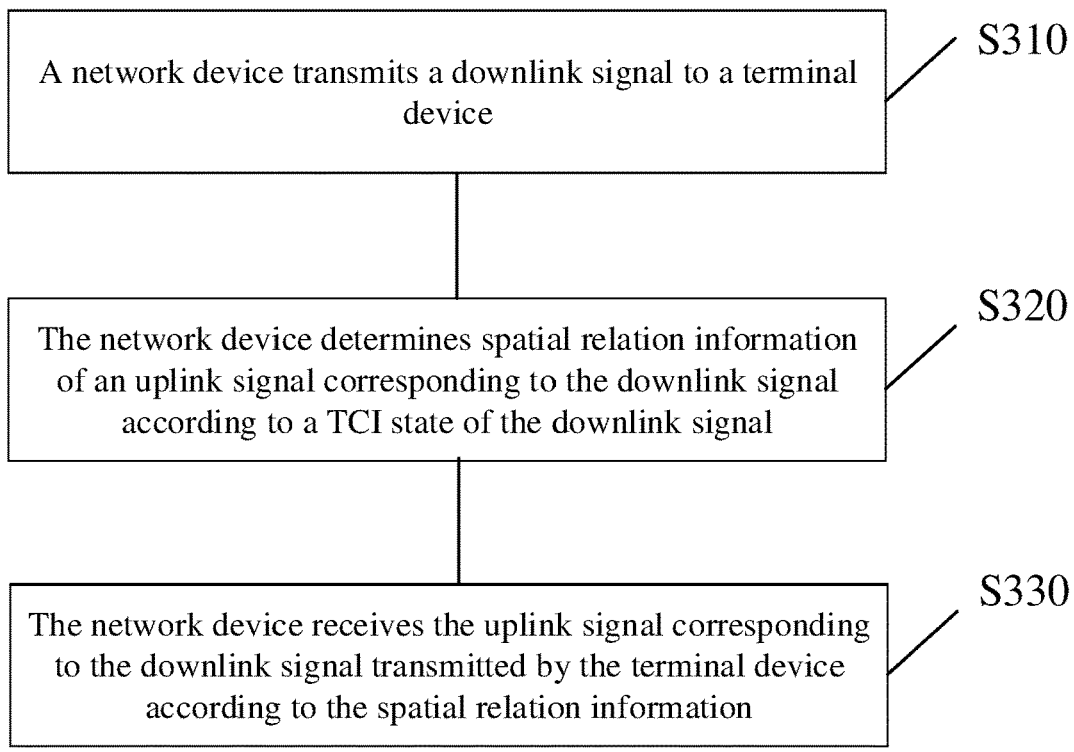
FIG. 3 is a schematic diagram of another method for transmitting an uplink signal according to an embodiment of the present disclosure.

FIG. 3 is a schematic diagram of another method for transmitting an uplink signal according to an embodiment of the present disclosure. The method shown in FIG. 3 includes steps 310-330.

In step 310, a network device transmits a downlink signal to a terminal device.

Optionally, the downlink signal may be a PDSCH, a PDCCH, a CSI-RS, and/or the like.

The PDSCH can be used to carry data information or high-level signaling. For example, the PDSCH can be used to transmit data, or to carry RRC signaling or MAC signaling.

The PDCCH can be used to carry scheduling information or control information. For example, the PDCCH can carry DCI, which can be used for scheduling uplink transmission.

In step 320, the network device determines spatial relationship information of an uplink signal corresponding to the downlink signal according to a TCI state of the downlink signal.

The uplink signal corresponding to the downlink signal may include at least one of a PUSCH, a PUCCH, and an SRS.

The spatial relationship information can be used for indicating a beam or antenna panel for receiving the uplink signal corresponding to the downlink signal.

The network device can configure the TCI state for each downlink signal. When the network device receives the uplink signal corresponding to the downlink signal transmitted by the terminal device, the network device can determine the spatial relationship information of the uplink signal corresponding to the downlink signal according to the TCI state of the downlink signal.

In step 330, the network device receives the uplink signal corresponding to the downlink signal transmitted by the terminal device by using the spatial relationship information.

In the technical solutions provided by the embodiments of the present disclosure, the spatial relationship information of the uplink signal corresponding to the downlink signal is determined according to the TCI state of the downlink signal. Since the TCI state of the downlink signal is associated with the TRP or antenna panel which transmits the downlink signal, different TRPs or antenna panels have their own independent TCI states. As such, the spatial relationship information of the uplink signal corresponding to the downlink signal determined by the TCI state of the downlink signal is also associated with the TRP or antenna panel. Therefore, when the terminal device transmits the uplink signal corresponding to the downlink signal based on the spatial relationship information, it can align with the TRP or antenna panel, which transmits the downlink signal and ensure the quality of the signal received by the terminal device through the TRP or antenna panel, thereby ensuring the communication quality.

There are various correspondences between the uplink signal and the downlink signal. Various forms of uplink signals corresponding to the downlink signals will be described in detail below.

It should be understood that the following description can be applied to the method shown in FIG. 2 as well as that shown in FIG. 3.

In the case where the downlink signal is the PDSCH, the uplink signal corresponding to the downlink signal may be the PUCCH or the SRS.

As an example, the downlink signal PDSCH can carry user data information, and the terminal device may need to provide acknowledgment/negative-acknowledgment (ACK/NACK) feedback corresponding to the data to the network device with respect to the reception situation of the PDSCH. As such, the uplink signal corresponding to the downlink signal can be the PUCCH which is used to carry the ACK/NACK feedback information of the PDSCH.

The network device may use different beams to transmit multiple PDSCHs to the terminal device. As such, the terminal device may need to provide the ACK/NACK feedback to the network device according to the reception situation of each PDSCH in the multiple PDSCHs.

For example, the network device may use different beams to transmit a first PDSCH and a second PDSCH to the terminal device. When the terminal device performs ACK/NACK feedback on the first PDSCH, a first PUCCH may be used to carry the ACK/NACK feedback information of the first PDSCH. When transmitting the first PUCCH, the terminal device may determine the spatial relationship information of the first PUCCH according to the TCI state of the first PDSCH, and then use the spatial relationship information of the first PUCCH to transmit the first PUCCH.

Similarly, when the terminal device performs the ACK/NACK feedback on the second PDSCH, a second PUCCH may be used to carry the ACK/NACK feedback information of the second PDSCH. When transmitting the second PUCCH, the terminal device may determine the spatial relationship information of the second PUCCH according to the TCI state of the second PDSCH, and then use the spatial relationship information of the second PUCCH to transmit the second PUCCH.

Optionally, when the terminal device receives the multiple PDSCHs transmitted by the network device, the terminal device can use the above-described method in which an independent PUCCH for the ACK/NACK feedback is used in the feedback for each of the PDSCHs, or can perform the feedback by carrying the ACK/NACK feedback information of the multiple PDSCHs on one PUCCH.

The terminal device can use different beams to receive the multiple PDSCHs. For the multiple PDSCHs, the terminal device can carry the ACK/NACK feedback information of at least two PDSCHs of the multiple PDSCHs on one PUCCH, and transmit the PUCCH to the network device.

Step 220 may further include determining, by the terminal device, the spatial relationship information of the uplink signal corresponding to the downlink signal according to the TCI state of at least one downlink signal in the multiple downlink signals. In other words, the terminal device can determine the spatial relationship information of the PUCCH according to the TCI state of at least one PDSCH in the multiple PDCSHs.

Preferably, the spatial relationship information for the PUCCH may be determined according to the TCI state of a last received PDSCH in the multiple PDSCHs.

The network device can use different beams to transmit the first PDSCH and the second PDSCH to the terminal device. When the terminal device performs the ACK/NACK feedback for the first PDSCH and the second PDSCH, the ACK/NACK feedback information for the two PDSCHs can be carried in one PUCCH so as to be transmitted to the network device. The spatial relationship information for the PUCCH may be determined according to the TCI state of the first PDSCH, or may be determined according to the TCI state of the second PDSCH.

If the terminal device receives the second PDSCH later than the first PDSCH, the terminal device may preferentially use the spatial relationship information determined from the TCI state of the second PDSCH to transmit the PUCCH.

Optionally, when the TCI states of the multiple PDSCHs are the same, the terminal device can carry the ACK/NACK feedback information of the multiple PDSCHs on one PUCCH, and transmit the PUCCH to the network device. The spatial relationship information used by the terminal device to transmit the PUCCH can be determined according to the same TCI state.

As another example, the PDSCH can carry the RRC signaling, and the RRC signaling can be used for configuring CSI reporting. After receiving the PDSCH, the terminal device can transmit to the network device a PUCCH which is used to carry information of the configured CSI reporting. As such, the downlink signal is the PDSCH carrying the RRC signaling, and the uplink signal corresponding to the downlink signal is the PUCCH carrying the corresponding CSI reporting.

The RRC signaling can also configure a period and/or reporting scheme of the CSI reporting.

The terminal device can periodically perform the CSI reporting to the network device according to the CSI period configured by the RRC signaling, and/or the terminal device can perform the CSI reporting to the network device according to the reporting scheme configured by the RRC signaling.

Optionally, the RRC signaling carried in the PDSCH can also be used for configuring the SRS. After receiving the PDSCH, the terminal device can transmit a periodic SRS to the network device. As such, the downlink signal is the PDSCH carrying the RRC signaling, and the uplink signal corresponding to the downlink signal is the SRS configured by the RRC signaling.

The RRC signaling can also be used for configuring a period and/or transmission scheme of the SRS.

The terminal device can periodically transmit the SRS to the network device according to the period of the SRS configured by the RRC signaling, and/or the terminal device can transmit the SRS to the network device according to the transmission scheme configured by the RRC signaling.

As another example, the PDSCH can also carry the MAC signaling which can be used for activating the CSI reporting. After receiving the PDSCH, the terminal device can transmit to the network device the PUCCH which is used for carrying information of the activated CSI reporting. As such, the downlink signal is the PDSCH carrying the MAC signaling, and the uplink signal corresponding to the downlink signal is the PUCCH carrying the CSI reporting.

Optionally, the MAC signaling carried in the PDSCH can also be used for activating an SRS. After receiving the PDSCH, the terminal device can transmit the SRS to the network device. As such, the downlink signal is the PDSCH carrying the MAC signaling, and the uplink signal corresponding to the downlink signal is the SRS activated by the MAC signaling.

In the case where the downlink signal is the PDCCH, the uplink signal corresponding to the downlink signal may be the PUSCH, the PUCCH and/or the SRS.

Optionally, the PDCCH can be used to carry the DCI.

The DCI can be used for scheduling data transmission, and the data transmission can be carried on the PUSCH. As such, the uplink signal corresponding to the downlink signal PDCCH is the PUSCH carrying the data transmission.

The DCI can be used for triggering the CSI reporting, and the CSI measured by the terminal device can be carried on the PUSCH or the PUCCH. As such, the uplink signal corresponding to the downlink signal PDCCH is the PUSCH or PUCCH carrying the CSI reporting.

The DCI can be used for triggering the SRS, and the terminal device can transmit the SRS to the network device based on the DCI. As such, the uplink signal corresponding to the downlink signal PDCCH is the SRS triggered by the DCI.

In the case where the downlink signal is the CSI-RS, the uplink signal corresponding to the downlink signal is the PUSCH, PUCCH, or SRS.

The terminal device can measure the CSI based on the CSI-RS, and carry the measured CSI on the PUSCH or PUCCH. As such, the uplink signal corresponding to the downlink signal CSI-RS is the PUSCH or PUCCH carrying the CSI.

In the case where the downlink signal is the CSI-RS, the uplink signal corresponding to the downlink signal can be the SRS, where a pre-coding vector of the SRS is determined according to channel information obtained from the CSI-RS measurement.

Optionally, prior to transmitting the SRS, the terminal device can select the SRS to be transmitted to the network device according to a preset correspondence between at least one CSI-RS and at least one SRS.

The correspondence between the at least one CSI-RS and the at least one SRS may refer to the correspondence between the CSI-RS resource for transmitting the CSI-RS and the SRS resource for transmitting the SRS. For example, the network device can configure different CSI-RS resources for different SRS resources through high-level signaling to obtain the pre-coding vector of the SRS resource.

The network device can configure a corresponding TCI state for each downlink signal. The TCI state of the downlink signal can include at least one of a CSI-RS resource index, an SSB index, and a phase tracking reference signal (PTRS) port. Determining by the terminal device the spatial relationship information of the uplink signal corresponding to the downlink signal according to the at least one TCI state of the downlink signal may refer to that the terminal device determines the spatial relationship information of the uplink signal corresponding to the downlink signal according to at least one of the CSI-RS resource index, the SSB index, and the PTRS port corresponding to the downlink signal which are included in the at least one TCI state of the downlink signal.

Specifically, the terminal device can use the CSI-RS resource index, the SSB index and/or the PTRS port included in at least one TCI state of the downlink signal as the spatial relationship information of the uplink signal corresponding to the downlink signal.

It should be noted that each TCI state in at least one TCI state of the downlink signal may include at least one of the CSI-RS resource index, the SSB index, and the PTRS port.

Optionally, the spatial relationship information of the uplink signal corresponding to the downlink signal can be used for indicating a beam or antenna panel used for transmitting the uplink signal corresponding to the downlink signal.

Specifically, the beam used by the terminal device to transmit the uplink signal corresponding to the downlink signal may be the one used by the terminal device to receive the downlink signal included in the spatial relationship information.

It should be noted that the downlink signal included in the spatial relationship information may be the CSI-RS or the SSB.

For example, the beam used by the terminal device to transmit the uplink signal corresponding to the downlink signal may be the same as the beam used for receiving the CSI-RS resource indicated by the CSI-RS resource index in the TCI state. The terminal device determines the beam used for receiving the CSI-RS resource corresponding to the CSI-RS resource index as the beam used for the uplink signal corresponding to the downlink signal.

For another example, the beam used by the terminal device to transmit the uplink signal corresponding to the downlink signal may be the same as the beam used for the SSB indicated by the SSB index in the TCI state. The terminal device determines the beam used for receiving the SSB corresponding to the SSB index as the beam used for the uplink signal corresponding to the downlink signal.

For still another example, the beam used by the terminal device to transmit the uplink signal corresponding to the downlink signal may be the same as the beam corresponding to the PTRS port included in the TCI state.

Optionally, the TCI state of the downlink signal can include the PTRS port corresponding to the downlink signal. The spatial relationship information can be the beam used for transmitting the uplink signal corresponding to the downlink signal.

The terminal device may first determine at least one beam, select the beam corresponding to the PTRS port corresponding to the downlink signal from the at least one beam according to the PTRS port, and use the same as the beam used for transmitting the uplink signal corresponding to the downlink signal.

Specifically, the terminal device can determine the beam corresponding to the PTRS port according to the PTRS port and a correspondence between at least one beam and at least one PTRS port. The correspondence between the at least one beam and the at least one PTRS port may be configured by the network device through high-level signaling, or determined by the terminal side itself.

For example, if the terminal device supports two downlink PTRS ports, each of the PTRS ports can correspond to a beam group, and different PTRS ports correspond to different beam groups, the terminal device can select a beam from the corresponding beam group according to the PTRS port to transmit the uplink signal corresponding to the downlink signal.

The antenna panel used by the terminal device to transmit the uplink signal corresponding to the downlink signal can be the antenna panel used by the terminal device to receive the downlink signal included in the spatial relationship information.

For example, the antenna panel used by the terminal device to transmit the uplink signal corresponding to the downlink signal can be the same as the antenna panel used for receiving the CSI-RS resource indicated by the CSI-RS resource index in the TCI state. The terminal device determines the antenna panel used for receiving the CSI-RS resource corresponding to the CSI-RS resource index as the antenna panel used for the uplink signal corresponding to the downlink signal.

For another example, the antenna panel used by the terminal device to transmit the uplink signal corresponding to the downlink signal may be the same as the antenna panel used for the SSB indicated by the SSB index in the TCI state. The terminal device determines the antenna panel used for receiving the SSB corresponding to the SSB index as the antenna panel used for the uplink signal corresponding to the downlink signal.

For still another example, the antenna panel used by the terminal device to transmit the uplink signal corresponding to the downlink signal may be the same as the antenna panel corresponding to the PTRS port included in the TCI state.

The terminal device can include at least one antenna panel, and can select an antenna panel corresponding to the PTRS port corresponding to the downlink signal from the at least one antenna panel according to the PTRS port, as the antenna panel for transmitting the uplink signal corresponding to the downlink signal.

Specifically, the terminal device can determine the antenna panel corresponding to the PTRS port according to the PTRS port and a correspondence between at least one antenna panel and at least one PTRS port. The correspondence between the at least one antenna panel and the at least one PTRS port may be configured by the network device through the high-level signaling, or may be determined by the terminal device itself.

For example, if the terminal supports two downlink PTRS ports, each of the PTRS ports can correspond to an antenna panel, and different PTRS ports correspond to different antenna panels, the terminal transmits the uplink signal corresponding to the downlink signal from the corresponding antenna panel according to the PTRS port.

It should be understood that the antenna panel involved in the correspondence between the at least one antenna panel and the at least one PTRS port refers to the antenna panel of the terminal device.

In the technical solution provided by the embodiments of the present disclosure, the beam and/or antenna panel used by the terminal device to receive the downlink signal and to transmit the uplink signal are determined according to the TCI state of the downlink signal, and the beam and/or antenna panel used by the terminal device to receive the downlink signal are the same as the beam and/or antenna panel for transmitting the uplink signal corresponding to the downlink signal, which can ensure that the beam or antenna panel in the same direction is used for uplink and downlink transmission, and ensure the reliability of the uplink and downlink transmission of the terminal device.

Similarly, as for the method for the network device to determine the beam or antenna panel used for the uplink signal corresponding to the downlink signal, reference can be made to the method for the terminal device to determine the beam or antenna panel used for the uplink signal corresponding to the downlink signal as described above.

Optionally, each TCI state in the at least one TCI state of the downlink signal can include at least one of a CSI-RS resource index, an SSB index, and a PTRS port corresponding to the downlink signal, the spatial relationship information is the beam or antenna panel used for receiving the uplink signal corresponding to the downlink signal, and determining by the network device the spatial relationship information of the uplink signal corresponding to the down-link signal according to the at least one TCI state of the downlink signal includes that the network device can determine a beam used for transmitting a CSI-RS resource corresponding to the CSI-RS resource index as the beam for receiving the uplink signal corresponding to the downlink signal; the network device can determine an antenna panel used for transmitting the CSI-RS resource corresponding to the CSI-RS resource index as the antenna panel for receiving the uplink signal corresponding to the downlink signal; the network device can determine the beam used for transmitting an SSB corresponding to the SSB index as the beam for transmitting the uplink signal corresponding to the downlink signal; and/or the network device can determine the antenna panel used for the SSB corresponding to the SSB index as the antenna panel for transmitting the uplink signal corresponding to the downlink signal.

The network device can select a beam corresponding to a PTRS port corresponding to the downlink signal from at least one beam according to the PTRS port, as the beam for receiving the uplink signal corresponding to the downlink signal; and/or, the network device can select an antenna panel corresponding to the PTRS port corresponding to the downlink signal from at least one antenna panel according to the PTRS port, as the antenna panel for receiving the uplink signal corresponding to the downlink signal.

Specifically, the network device can determine the beam corresponding to the PTRS port corresponding to the downlink signal according to the PTRS port and a correspondence between at least one beam and at least one PTRS port; and/or, the network device can determine the antenna panel corresponding to the PTRS port corresponding to the downlink signal according to the PTRS port and a correspondence between at least one antenna panel and at least one PTRS port. It should be understood that the antenna panel involved in the correspondence between the at least one antenna panel and the at least one PTRS port refers to the antenna panel of the network device.

Optionally, determining by the terminal device the spatial relationship information of the uplink signal corresponding to the downlink signal according to the at least one TCI state of the downlink signal can include determining by the terminal device the spatial relationship information of the uplink signal corresponding to the downlink signal according to a first TCI state in the at least one TCI state of the downlink signal.

The first TCI state can be any one of the following: a first one of the at least one TCI state, a second one of the at least one TCI state, the TCI state including the SSB index in the at least one TCI state, the TCI state corresponding to a first demodulation reference signal (DMRS) port group in the at least one TCI state, the TCI state corresponding to a second DMRS port group in the at least one TCI state, the TCI state including a first PTRS port in the at least one TCI state, and the TCI state including a second PTRS port in the at least one TCI state.

Optionally, the first TCI state can be agreed upon between the terminal device and the network device, or be specified in a protocol.

Optionally, the terminal device can select the first TCI state from the at least one TCI state, and determine the spatial relationship information of the uplink signal corresponding to the downlink signal according to the selected first TCI state.

Optionally, in some embodiments, one downlink signal may be transmitted by multiple TRPs or multiple antenna panels. For example, when the downlink signal is the PDSCH, the data carried by the PDSCH may be transmitted by the multiple TRPs or multiple antenna panels, and the downlink signal PDSCH includes multiple TCI states.

When transmitting the uplink signal corresponding to the PDSCH, the terminal device may only need to transmit it to one of the TRPs or antenna panels. As such, the terminal device can determine the spatial relationship information of the uplink signal corresponding to the downlink signal according to the first TCI state in the multiple TCI states of the downlink signal.

Optionally, in the at least one TCI state, a TCI state firstly indicated by the network device can be the first TCI state, and a TCI state secondly indicated by the network device can be the second TCI state.

For example, if the network device indicates two TCI states in one downlink signaling, the TCI state with a front bit position in the two TCI states can be understood as the first TCI state, and a TCI state with a later bit position can be understood as the second TCI state.

Optionally, the first TCI state may be the TCI state including the SSB index in the at least one TCI state, the TCI state including the CSI-RS resource index in the at least one TCI state, or the TCI state including the PTRS port of the downlink signal in the at least one TCI state.

Optionally, the terminal device can determine the spatial relationship information of the uplink signal corresponding to the downlink signal according to the TCI state corresponding to any one of the DMRS port groups in the at least one TCI state.

For example, the terminal device can determine the spatial relationship information of the uplink signal corresponding to the downlink signal according to the TCI state corresponding to a first DMRS port group in the at least one TCI state. Alternatively, the terminal device can determine the spatial relationship information of the uplink signal corresponding to the downlink signal according to the TCI state corresponding to a second DMRS port group in the at least one TCI state.

Optionally, each TCI state in the at least one TCI state corresponds to one DMRS port group, and the network device can configure the TCI state corresponding to each DMRS port group in the signaling (for example, RRC signaling) for configuring each port group.

Alternatively, if the terminal device is configured with N DMRS port groups, the network device can indicate N TCI states in the DCI, where each of the N DMRS port groups correspond to one of the N TCI states, and N is a positive integer.

An order of the DMRS port groups can be understood as sequence numbers of the DMRS port groups.

Optionally, the first TCI state can be the TCI state including any one of the PTRS ports in the at least one TCI state. For example, the first TCI state may be the TCI state including a first PTRS port in the at least one TCI state, or the TCI state including a second PTRS port in the at least one TCI state.

An order of PTRS ports can be understood as sequence numbers of the PTRS ports.

Optionally, the TRP or antenna panel corresponding to the first TCI can also be understood as the TRP or antenna panel used by the network device to transmit the DCI carrying the TCI state of the downlink signal.

Optionally, the network device can also configure the spatial relationship information for the uplink signal corresponding to the downlink signal.

In the case where the network device configures the spatial relationship information for the uplink signal corresponding to the downlink signal, the terminal device can transmit the uplink signal corresponding to the downlink signal by using the spatial relationship information configured by the network device or by using the spatial relationship information determined through the method as described above.

As an embodiment, in the case where the spatial relationship information is configured by the network device, the terminal device transmits the uplink signal corresponding to the downlink signal by using the spatial relationship information configured by the network device. In the case where the spatial relationship information is not configured by the network device, the terminal device can transmit the uplink signal corresponding to the downlink signal by using the spatial relationship information determined by the method described above.

As another embodiment, regardless of whether the spatial relationship information of the uplink signal is configured by the network device or not, the terminal device can use the spatial relationship information determined by the method described above to transmit the uplink signal corresponding to the downlink signal.

Prior to transmitting the uplink signal corresponding to the downlink signal to the network device, the terminal device can determine whether a beam correspondence is satisfied.

The beam correspondence may refer to that when the terminal device receives a downlink signal by using a beam in a certain direction, if the beam in this direction can also be used to transmit an uplink signal, it indicates that the beam correspondence is satisfied; otherwise, the beam correspondence is not satisfied.

In a case where the beam correspondence is satisfied, the terminal device can use the spatial relationship information determined by the method described above to transmit the uplink signal corresponding to the downlink signal even if the network device has configured the spatial relationship information of the uplink signal.

In a case where the beam correspondence is not satisfied, the terminal device preferentially uses the spatial relationship information configured by the network device to transmit the uplink signal corresponding to the downlink signal.

Optionally, the beam correspondence may be a type of capability information of the terminal device, and the terminal device can report to the network device whether the beam correspondence is satisfied or not. After receiving from the terminal device a message that the beam correspondence is satisfied, the network device may not configure the spatial relationship information of the uplink signal for the terminal device any more. As such, the spatial relationship information used by the terminal device to transmit the uplink signal corresponding to the downlink signal can be determined according to the method described above.

After receiving the message that the beam correspondence is not satisfied transmitted from the terminal device, the network device can configure the spatial relation message of the uplink signal for the terminal device. As such, the terminal device can use the spatial relationship information configured by the network device to transmit the uplink signal corresponding to the downlink signal.

Optionally, the terminal device may not report to the network device whether the beam correspondence is satisfied or not, and the network device may configure the spatial relationship information for each uplink signal. At this time, the terminal device can select the spatial relationship information used for transmitting the uplink signal corresponding to the downlink signal according to whether the beam correspondence is satisfied or not.

For example, in a case where the beam correspondence is satisfied, the terminal device can use the spatial relationship information determined by the method described above to transmit the uplink signal corresponding to the downlink signal. In a case where the beam correspondence is not satisfied, the terminal device can use the spatial relationship information configured by the network device to transmit the uplink signal corresponding to the downlink signal.

Optionally, prior to determining by the terminal device the spatial relationship information of the uplink signal corresponding to the downlink signal according to the at least one TCI state of the downlink signal, the method shown in FIG. 2 further includes:

determining the TCI state of the downlink signal by the terminal device according to the RRC signaling for configuring the downlink signal, the MAC signaling for activating the downlink signal, or the DCI for triggering the downlink signal.

Figure 4:
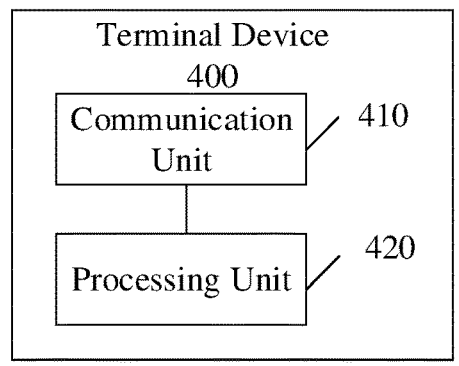
FIG. 4 is a schematic block diagram of a terminal device according to an embodiment of the present disclosure.

FIG. 4 is a schematic block diagram of a terminal device 400 according to an embodiment of the present disclosure. As shown in FIG. 4, the terminal device 400 includes a communication unit 410 and a processing unit 420.

The communication unit 410 is configured to receive a downlink signal transmitted by a network device.

The processing unit 420 is configured to determine spatial relationship information of an uplink signal corresponding to the downlink signal according to at least one TCI state of the downlink signal.

The communication unit 410 is further configured to transmit the uplink signal corresponding to the downlink signal to the network device by using the spatial relationship information.

Optionally, the downlink signal includes at least one of a Physical Downlink Shared Channel (PDSCH), a Physical Downlink Control Channel (PDCCH), and a Channel State Information Reference Signal (CSI-RS), and the uplink signal corresponding to the downlink signal includes at least one of a Physical Uplink Shared Channel (PUSCH), a Physical Uplink Control Channel (PUCCH) and a Sounding Reference Signal (SRS).

Optionally, the downlink signal is the PDSCH, and the uplink signal corresponding to the downlink signal is the PUCCH or the SRS.

Optionally, the downlink signal is the PDSCH, and the uplink signal corresponding to the downlink signal is the PUCCH which is used to carry acknowledgment/negative-acknowledgment (ACK/NACK) information of the PDSCH.

Optionally, the PUCCH is used to carry the ACK/NACK information of multiple PDSCHs.

Optionally, the processing unit 420 is specifically configured to determine the spatial relationship information of the PUCCH according to the TCI state of at least one PDSCH in the multiple PDSCHs.

Optionally, the processing unit 420 is specifically configured to determine the spatial relationship information of the PUCCH according to the TCI state of a last received PDSCH in the multiple PDSCHs.

Optionally, the PUCCH is used to carry the ACK/NACK information of multiple PDSCHs, the TCI states of the multiple PDSCHs are the same, and the processing unit 420 is specifically configured to determine the spatial relationship information of the PUCCH according to the same TCI state.

Optionally, the downlink signal is the PDSCH carrying Radio Resource Control (RRC) signaling, the RRC signaling is used to configure Channel State Information (CSI)

reporting, and the uplink signal corresponding to the downlink signal is the PUCCH carrying the CSI reporting.

Optionally, the downlink signal is the PDSCH carrying Radio Resource Control (RRC) signaling, the RRC signaling is used to configure a Sounding Reference Signal (SRS), and the uplink signal corresponding to the downlink signal is the configured SRS.

Optionally, the downlink signal is the PDSCH carrying Media Access Control (MAC) signaling, the MAC signaling is used to activate CSI reporting, and the uplink signal corresponding to the downlink signal is the PUCCH carrying the CSI reporting.

Optionally, the downlink signal is the PDSCH carrying the MAC signaling, the MAC signaling is used to activate an SRS signal, and the uplink signal corresponding to the downlink signal is the activated SRS signal.

Optionally, the downlink signal is the PDCCH, and the uplink signal corresponding to the downlink signal is the PUSCH, PUCCH, or SRS.

Optionally, the downlink signal is the PDCCH carrying Downlink Control Information (DCI), the uplink signal corresponding to the downlink signal is the PUSCH, and the PUSCH is used to carry data scheduled by the DCI or to carry CSI reporting triggered by the DCI.

Optionally, the downlink signal is the PDCCH carrying the DCI, the uplink signal corresponding to the downlink signal is the PUCCH, and the PUCCH is used to carry the CSI reporting triggered by the DCI.

Optionally, the downlink signal is the PDCCH carrying the DCI, and the uplink signal corresponding to the downlink signal is the SRS triggered by the DCI.

Optionally, the downlink signal is the CSI-RS, and the uplink signal corresponding to the downlink signal is the PUSCH, PUCCH, or SRS.

Optionally, the downlink signal is the CSI-RS, the uplink signal corresponding to the downlink signal is the PUSCH, and the PUSCH is used to carry the CSI measured based on the CSI-RS.

Optionally, the downlink signal is the CSI-RS, the uplink signal corresponding to the downlink signal is the PUSCH or PUCCH, and the PUSCH or PUCCH is used to carry the CSI measured based on the CSI-RS.

Optionally, the downlink signal is the CSI-RS, the uplink signal corresponding to the downlink signal is the SRS, and a pre-coding vector of the SRS is determined based on the CSI-RS.

Optionally, the at least one TCI state of the downlink signal includes a CSI-RS resource index, the spatial relationship information is a beam or antenna panel used for transmitting the uplink signal corresponding to the downlink signal, and the processing unit 420 is specifically configured to determine the beam used for receiving a CSI-RS resource corresponding to the CSI-RS resource index as the beam for transmitting the uplink signal corresponding to the downlink signal; and/or, determine the antenna panel used for receiving the CSI-RS resource corresponding to the CSI-RS resource index as the antenna panel for transmitting the uplink signal corresponding to the downlink signal.

Optionally, the at least one TCI state of the downlink signal includes an SSB index, the spatial relationship information is a beam or antenna panel used for transmitting the uplink signal corresponding to the downlink signal, and the processing unit 420 is specifically configured to determine the beam used for receiving an SSB corresponding to the SSB index as the beam for transmitting the uplink signal corresponding to the downlink signal; and/or determine the antenna panel used for receiving the SSB corresponding to the SSB index as the antenna panel for transmitting the uplink signal corresponding to the downlink signal.

Optionally, the at least one TCI state of the downlink signal includes a PTRS port corresponding to the downlink signal, the spatial relationship information is a beam or antenna panel used for transmitting the uplink signal corresponding to the downlink signal, and the processing unit 420 is specifically configured to:
  according to the PTRS port corresponding to the downlink signal, select the beam corresponding to the PTRS port from at least one beam, as the beam for transmitting the uplink signal corresponding to the downlink signal; and/or,
  according to the PTRS port corresponding to the downlink signal, select the antenna panel corresponding to the PTRS port from at least one antenna panel, as the antenna panel for transmitting the uplink signal corresponding to the downlink signal.

Optionally, the processing unit 420 is specifically configured to:
  determine the beam corresponding to the PTRS port corresponding to the downlink signal according to the PTRS port and a correspondence between at least one beam and at least one PTRS port, where the correspondence between the at least one beam and the at least one PTRS port is configured by the network device through high-level signaling; or
  the processing unit 420 is specifically configured to:
  determine the antenna panel corresponding to the PTRS port corresponding to the downlink signal according to the PTRS port and a correspondence between at least one antenna panel and at least one PTRS port, where the correspondence between the at least one antenna panel and the at least one PTRS port is configured by the network device through the high-level signaling.

Optionally, the processing unit 420 is specifically configured to determine the spatial relationship information of the uplink signal corresponding to the downlink signal according to a first TCI state in the at least one TCI state.

Optionally, the first TCI state is any one of the following: a first one of the at least one TCI state; a second one of the at least one TCI state; the TCI state including the SSB index in the at least one TCI state; the TCI state corresponding to a first demodulation reference signal DMRS port group in the at least one TCI state; the TCI state corresponding to a second DMRS port group in the at least one TCI state; the TCI state including a first PTRS port in the at least one TCI state; and the TCI state including a second PTRS port in the at least one TCI state.

Optionally, the processing unit 420 is further configured to determine that a spatial correspondence of the terminal device is satisfied.

Optionally, the processing unit 420 is further configured to determine the at least one TCI state of the downlink signal according to the RRC signaling for configuring the downlink signal, the MAC signaling for activating the downlink signal or the DCI for triggering the downlink signal.

It should be understood that the terminal device 400 can perform the corresponding operations performed by the terminal device in the foregoing method 200, and for the sake of brevity, details are not described herein again.

Figure 5:
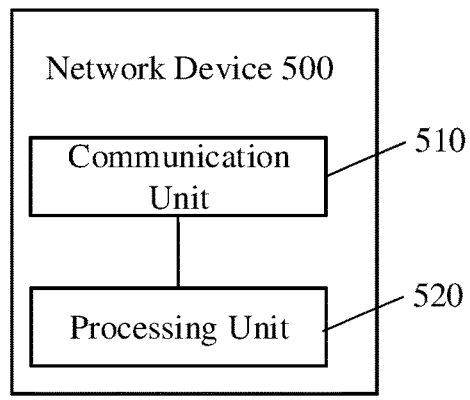
FIG. 5 is a schematic block diagram of a network device according to an embodiment of the present disclosure.

FIG. 5 is a schematic block diagram of a network device 500 according to an embodiment of the present disclosure. As shown in FIG. 5, the network device 500 includes a communication unit 510 and a processing unit 520.

The communication unit 510 is configured to transmit a downlink signal to a terminal device.

The processing unit 520 is configured to determine spatial relationship information of an uplink signal corresponding to the downlink signal according to at least one TCI state of the downlink signal.

The communication unit 510 is further configured to receive the uplink signal corresponding to the downlink signal transmitted by the terminal device by using the spatial relationship information.

Optionally, the downlink signal includes at least one of a Physical Downlink Shared Channel (PDSCH), a Physical Downlink Control Channel (PDCCH), and a Channel State Information Reference Signal (CSI-RS), and the uplink signal corresponding to the downlink signal includes at least one of a Physical Uplink Shared Channel (PUSCH), a Physical Uplink Control Channel (PUCCH) and a Sounding Reference Signal (SRS).

Optionally, the downlink signal is the PDSCH, and the uplink signal corresponding to the downlink signal is the PUCCH or the SRS.

Optionally, the downlink signal is the PDSCH, and the uplink signal corresponding to the downlink signal is the PUCCH which is used to carry acknowledgment/negative-acknowledgment (ACK/NACK) information of the PDSCH.

Optionally, the PUCCH is used to carry the ACK/NACK information of multiple PDSCHs, and the processing unit 520 is specifically configured to determine the spatial relationship information of the PUCCH according to the TCI state of at least one PDSCH in the multiple PDSCHs.

Optionally, the processing unit 520 is specifically configured to determine the spatial relationship information of the PUCCH according to the TCI state of a last transmitted PDSCH in the multiple PDSCHs.

Optionally, the downlink signal is the PDSCH carrying Radio Resource Control (RRC) signaling, the RRC signaling is used to configure Channel State Information (CSI) reporting, and the uplink signal corresponding to the downlink signal is the PUCCH carrying the CSI reporting.

Optionally, the downlink signal is the PDSCH carrying the RRC signaling, the RRC signaling is used to configure a Sounding Reference Signal (SRS), and the uplink signal corresponding to the downlink signal is the configured SRS.

Optionally, the downlink signal is the PDSCH carrying the RRC signaling, the RRC signaling is used to configure the SRS, and the uplink signal corresponding to the downlink signal is the SRS.

Optionally, the downlink signal is the PDSCH carrying Media Access Control (MAC) signaling, the MAC signaling is used to activate CSI reporting, and the uplink signal corresponding to the downlink signal is the PUCCH carrying the CSI reporting.

Optionally, the downlink signal is the PDSCH carrying the MAC signaling, the MAC signaling is used to activate an SRS signal, and the uplink signal corresponding to the downlink signal is the activated SRS signal.

Optionally, the downlink signal is the PDCCH, and the uplink signal corresponding to the downlink signal is the PUSCH, PUCCH, or SRS.

Optionally, the downlink signal is the PDCCH carrying Downlink Control Information (DCI), the uplink signal corresponding to the downlink signal is the PUSCH, and the PUSCH is used to carry data scheduled by the DCI or to carry CSI reporting triggered by the DCI.

Optionally, the downlink signal is the PDCCH carrying the DCI, the uplink signal corresponding to the downlink signal is the PUCCH, and the PUCCH is used to carry the CSI reporting triggered by DCI.

Optionally, the downlink signal is the PDCCH carrying the DCI, and the uplink signal corresponding to the downlink signal is the SRS triggered by the DCI.

Optionally, the downlink signal is the CSI-RS, and the uplink signal corresponding to the downlink signal is the PUSCH, PUCCH, or SRS.

Optionally, the downlink signal is the CSI-RS, the uplink signal corresponding to the downlink signal is the PUSCH or PUCCH, and the PUSCH or PUCCH is used to carry the CSI measured based on the CSI-RS.

Optionally, the downlink signal is the CSI-RS, the uplink signal corresponding to the downlink signal is the PUCCH, and the PUCCH is used to carry the CSI measured based on the CSI-RS.

Optionally, the downlink signal is the CSI-RS, the uplink signal corresponding to the downlink signal is the SRS, and a pre-coding vector of the SRS is determined based on the CSI-RS.

Optionally, the at least one TCI state of the downlink signal includes a CSI-RS resource index, the spatial relationship information is a beam or antenna panel used for receiving the uplink signal corresponding to the downlink signal, and the processing unit 420 is specifically configured to determine the beam used for receiving a CSI-RS resource corresponding to the CSI-RS resource index as the beam for receiving the uplink signal corresponding to the downlink signal; and/or determine the antenna panel used for transmitting the CSI-RS resource corresponding to the CSI-RS resource index as the antenna panel for receiving the uplink signal corresponding to the downlink signal.

Optionally, the at least one TCI state of the downlink signal includes an SSB index, the spatial relationship information is a beam or antenna panel used for receiving the uplink signal corresponding to the downlink signal, and the processing unit 420 is specifically configured to: determine the beam used for transmitting an SSB corresponding to the SSB index as the beam for receiving the uplink signal corresponding to the downlink signal; and/or, determine the antenna panel used for transmitting the SSB corresponding to the SSB index as the antenna panel for receiving the uplink signal corresponding to the downlink signal.

Optionally, the at least one TCI state of the downlink signal includes a PTRS port corresponding to the downlink signal, the spatial relationship information is a beam or antenna panel used for transmitting the uplink signal corresponding to the downlink signal, and the processing unit 520 is specifically configured to:

according to the PTRS port corresponding to the downlink signal, select the beam corresponding to the PTRS port from at least one beam, as the beam for receiving the uplink signal corresponding to the downlink signal; and/or, according to the PTRS port corresponding to the downlink signal, select the antenna panel corresponding to the PTRS port from at least one antenna panel, as the antenna panel for receiving the uplink signal corresponding to the downlink signal.

Optionally, the processing unit 520 is specifically configured to:

determine the beam corresponding to the PTRS port corresponding to the downlink signal according to the PTRS port and a correspondence between at least one beam and at least one PTRS port; and/or determine the antenna panel corresponding to the PTRS port corresponding to the downlink signal according to the PTRS port and a correspondence between at least one antenna panel and at least one PTRS port.

Optionally, the processing unit 520 is specifically configured to determine the spatial relationship information of the uplink signal corresponding to the downlink signal according to a first TCI state in the at least one TCI state.

Optionally, the first TCI state is any one of a first one of the at least one TCI state; a second one of the at least one TCI state; the TCI state including the SSB index in the at least one TCI state; the TCI state corresponding to a first demodulation reference signal DMRS port group in the at least one TCI state; the TCI state corresponding to a second DMRS port group in the at least one TCI state; the TCI state including a first PTRS port in the at least one TCI state; and the TCI state including a second PTRS port in the at least one TCI state.

Optionally, the communication unit 510 is further configured to receive a message transmitted by the terminal device that a spatial correspondence is satisfied.

It should be understood that the network device 500 can perform the corresponding operations performed by the network device in the foregoing method 300, and for the sake of brevity, details are not described herein again.

Figure 6:
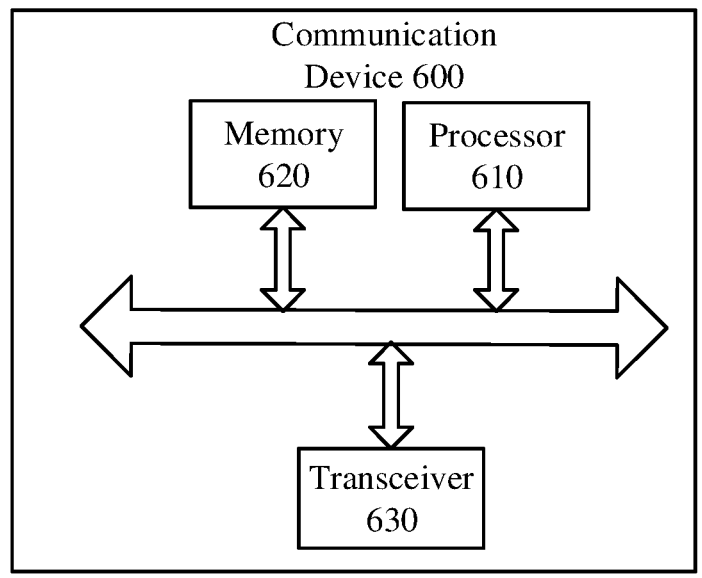
FIG. 6 is a schematic block diagram of a communication device according to an embodiment of the present disclosure.

FIG. 6 is a schematic structural diagram of a communication device 600 according to an embodiment of the present disclosure. The communication device 600 shown in FIG. 6 includes a processor 610. The processor 610 can invoke and execute a computer program from a memory to carry out the methods in the embodiments of the present disclosure.

Optionally, as shown in FIG. 6, the communication device 600 can further include a memory 620. The processor 610 can invoke and run the computer program from the memory 620 to carry out the methods in the embodiments of the present disclosure.

The memory 620 can be a separate device independent of the processor 610, or can be integrated in the processor 610.

Optionally, as shown in FIG. 6, the communication device 600 can further include a transceiver 630, and the processor 610 can control the transceiver 630 to communicate with other devices, and particularly to transmit information or data to other devices, or to receive information or data transmitted from other devices.

The transceiver 630 can include a transmitter and a receiver. The transceiver 630 can further include one or more antennas.

Optionally, the communication device 600 can specifically be the terminal device in the embodiments of the present disclosure, and the communication device 600 can carry out the corresponding processes which are implemented by the terminal device in the methods of the embodiments of the present disclosure. For the sake of brevity, details are not described herein again.

Optionally, the communication device 600 can specifically be the network device in the embodiments of the present disclosure, and the communication device 600 can carry out the corresponding processes which are implemented by the network device in the methods of the embodiments of the present disclosure. For the sake of brevity, details are not described herein again.

Figure 7:
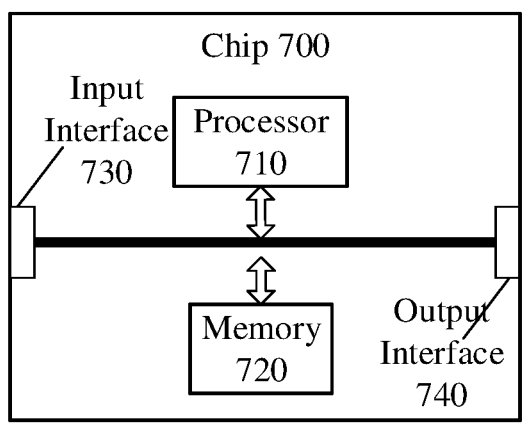
FIG. 7 is a schematic block diagram of a chip according to an embodiment of the present disclosure.

FIG. 7 is a schematic structural diagram of a chip according to an embodiment of the present disclosure. The chip 700 shown in FIG. 7 includes a processor 710, which can invoke and run a computer program from a memory to carry out the methods in the embodiments of the present disclosure.

Optionally, as shown in FIG. 7, the chip 700 can further include a memory 720. The processor 710 can invoke and run the computer program from the memory 720 to carry out the methods in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and particularly to obtain information or data transmitted by other devices or chips.

Optionally, the chip 700 can further include an output interface 740. The processor 710 can control the output interface 740 to communicate with other devices or chips, and particularly to output information or data to other devices or chips.

Optionally, the chip can be applied to the terminal device in the embodiments of the present disclosure, and the chip can carry out the corresponding processes which are implemented by the terminal device in the methods of the embodiments of the present disclosure. For the sake of brevity, details are not described herein again.

Optionally, the chip can be applied to the network device in the embodiments of the present disclosure, and the chip can carry out the corresponding processes which are implemented by the network device in the methods of the embodiments of the present disclosure. For the sake of brevity, details are not described herein again.

It should be understood that the chip mentioned in the embodiments of the present disclosure can also be referred to as a system-level chip, a system chip, a chip system, or a system-on-chip.

It should be understood that the processor of the embodiment of the present disclosure can be an integrated circuit chip with signal processing capability. In the implementations, the steps of the foregoing method embodiments can be performed by an integrated logic circuit of hardware in the processor or instructions in a form of software. The foregoing processor can be a general-purpose processor, a Digital Signal Processor (DSP), an Application Specific Integrated Circuit (ASIC), a Field Programmable Gate Array (FPGA), another programmable logic device, discrete gate or transistor logic device, or a discrete hardware component. The methods, steps, and logical blocks disclosed in the embodiments of the present disclosure can be implemented or performed. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or both. The non-volatile memory can be a Read-Only Memory (ROM), a Programmable ROM (PROM), an Erasable PROM (EPROM), an Electrically EPROM (EEPROM) or a flash memory. The volatile memory can be a Random Access Memory (RAM), which is used as an external cache. By way of example but not limitation, various forms of RAM are available, such as a Static RAM (SRAM), a Dynamic RAM (DRAM), a Synchronous DRAM (SDRAM), a Double SDRAM (DDR SDRAM), an Enhanced SDRAM (ESDRAM), a Synch-Link DRAM (SLDRAM) and a Direct Rambus RAM (DR RAM). It should be noted that the memory in the systems and methods described herein is intended to include, but is not limited to those and any other suitable types of memories.

It should be understood that the foregoing description of the memory is exemplary rather than limiting. For example, the memory in the embodiments of the present disclosure can also be a static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

Figure 8:
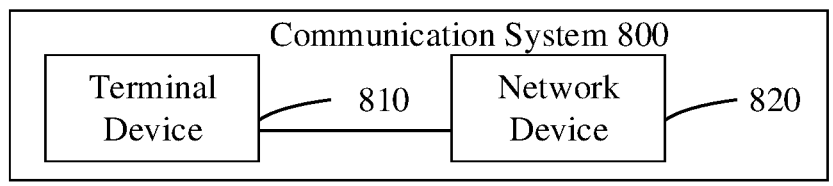
FIG. 8 is a schematic block diagram of a communication system according to an embodiment of the present disclosure.

FIG. 8 is a schematic block diagram of a communication system 800 according to an embodiment of the present disclosure. As shown in FIG. 8, the communication system 800 includes a terminal device 810 and a network device 820.

The terminal device 810 is configured to report to the network device an identification of at least one capability group to which capabilities supported by the terminal device belong.

The network device 820 is configured to receive the identification of the at least one capability group to which the capabilities supported by the terminal device belong, which is reported by the terminal device.

The terminal device 810 can be used to implement the corresponding functions implemented by the terminal device in the method shown in FIG. 2, and the composition of the terminal device 810 can be as shown in the terminal device 400 in FIG. 4. For the sake of brevity, details are not described here again.

The network device 820 can be used to implement the corresponding functions implemented by the network device in the method shown in FIG. 3, and the composition of the network device 820 can be as shown in the network device 500 in FIG. 5. For the sake of brevity, details are not described here again.

The embodiments of the present disclosure also provide a computer readable storage medium for storing a computer program. Optionally, the computer readable storage medium may be applied to the network device in the embodiments of the present disclosure, and the computer program causes a computer to perform the corresponding processes implemented by the network device in the methods of the embodiments of the present disclosure. For the sake of brevity, details are not described here again. Optionally, the computer readable storage medium may be applied to the terminal device in the embodiments of the present disclosure, and the computer program causes the computer to perform the corresponding processes implemented by the terminal device in the methods of the embodiments of the present disclosure. For the sake of brevity, details are not described here again.

The embodiments of the present disclosure also provide a computer program product including computer program instructions. Optionally, the computer program product can be applied to the network device in the embodiments of the present disclosure, and the computer program instructions cause a computer to perform the corresponding processes implemented by the network device in the methods of the embodiments of the present disclosure. For the sake of brevity, details are not described here again. Optionally, the computer program product can be applied to the terminal device in the embodiments of the present disclosure, and the computer program instructions cause the computer to perform the corresponding processes implemented by the terminal device in the methods of the embodiments of the present disclosure. For the sake of brevity, details are not described here again.

The embodiments of the present disclosure also provide a computer program. Optionally, the computer program can be applied to the network device in the embodiments of the present disclosure. When running on a computer, the computer program causes a computer to perform the corresponding processes implemented by the network device in the methods of the embodiments of the present disclosure. For the sake of brevity, details are not described here again. Optionally, the computer program can be applied to the terminal device in the embodiments of the present disclosure. When running on the computer, the computer program causes the computer to perform the corresponding processes implemented by the terminal device in the methods of the embodiments of the present disclosure. For the sake of brevity, details are not described here again.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

It should also be understood that, in the embodiment of the present disclosure, "A corresponding to B" means that A is associated with B, and A can be determined from B. However, it should also be understood that determining A from B does not mean that A is determined only from B, and A can also be determined from B and/or other information.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific application of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

According to the embodiments provided in the present disclosure, it should be understood that the systems, devices, and methods disclosed can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may or may not be physically separated, and the components shown as units may or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into a processing unit, or can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be defined by the claims.

What is claimed is:

1. A method for transmitting an uplink signal, comprising:
    sending, by a terminal device to a network device, capability information of the terminal device, wherein the capability information of the terminal device indicates whether a beam correspondence between a beam used for receiving a downlink signal and a beam used for transmitting an uplink signal corresponding to the downlink signal is supported by the terminal device, and the capability information is used for the network device to determine whether to configure spatial relationship information of the uplink signal for the terminal device, when the capability information indicates that the beam correspondence is supported by the terminal device, no spatial relationship information of the uplink signal is configured by the network device, and when the capability information indicates that the beam correspondence is not supported by the terminal device, the spatial relationship information of the uplink signal is configured by the network device;
    receiving, by the terminal device, the downlink signal transmitted by the network device;
    when the beam correspondence is not supported by the terminal device, receiving, by the terminal device, the spatial relationship information of the uplink signal configured by the network device, and transmitting, by the terminal device, the uplink signal to the network device according to the spatial relationship information configured by the network device; and
    when the beam correspondence is supported by the terminal device, determining, by the terminal device, at least one Transmission Configuration Indicator (TCI) state of the downlink signal according to MAC signaling for activating the downlink signal, determining, by the terminal device, the spatial relationship information of the uplink signal corresponding to the downlink signal according to the at least one TCI state of the downlink signal, and transmitting, by the terminal device, the uplink signal to the network device according to the determined spatial relationship information, wherein the TCI state is used by the terminal device to determine a spatial reception parameter of the downlink signal;
    wherein the downlink signal is a Physical Downlink Shared Channel (PDSCH), and the uplink signal corresponding to the downlink signal is of a Physical Uplink Control Channel (PUCCH), and the PUCCH is used to carry acknowledgment/negative-acknowledgment (ACK/NACK) information of the PDSCH,
    wherein the at least one TCI state comprises a Synchronization Signal Block (SSB) index, and the SSB index is used by the terminal device to determine the spatial reception parameter of the downlink signal, and
    wherein in a case where the terminal device receives a first PDSCH at a first time and a second PDSCH at a second time later than the first time, the terminal transmits the ACK/NACK feedback information of the first PDSCH and the second PDSCH in one PUCCH, and determines the spatial relationship information of the one PUCCH according to the at least one TCI state of the second PDSCH.

2. The method according to claim 1, wherein the spatial relationship information comprises a beam and/or an antenna panel used for transmitting the uplink signal corresponding to the downlink signal.

3. The method according to claim 1, wherein the spatial relationship information is a beam and/or an antenna panel used for transmitting the uplink signal corresponding to the downlink signal, and the determining, by the terminal device, the spatial relationship information of the uplink signal corresponding to the downlink signal according to the at least one TCI state comprises:
    determining, by the terminal device, the beam used for receiving an SSB corresponding to the SSB index, as the beam for transmitting the uplink signal corresponding to the downlink signal; and/or
    determining, by the terminal device, the antenna panel used for receiving the SSB corresponding to the SSB CSI index, as the antenna panel for transmitting the uplink signal corresponding to the downlink signal.

4. The method according to claim 1, wherein determining, by the terminal device, the spatial relationship information of the uplink signal corresponding to the downlink signal according to the at least one TCI state comprises:
    determining, by the terminal device, the spatial relationship information of the uplink signal corresponding to the downlink signal according to a first TCI state in the at least one TCI state.

5. The method according to claim 4, wherein the first TCI state is any one of the following:
    a first one of the at least one TCI state;
    a second one of the at least one TCI state;
    the TCI state including an SSB index in the at least one TCI state;
    the TCI state corresponding to a first demodulation reference signal (DMRS) port group in the at least one TCI state;

the TCI state corresponding to a second DMRS port group in the at least one TCI state;

the TCI state including a first Phase Tracking Reference Signal (PTRS) port in the at least one TCI state; or the TCI state including a second PTRS port in the at least one TCI state.

6. A terminal device, comprising:

a transceiver; and a processor;

wherein the transceiver is configured to:
 send capability information of the terminal device to a network device, the capability information of the terminal device indicates whether a beam correspondence between a beam used for receiving the downlink signal and a beam used for transmitting an uplink signal corresponding to the downlink signal is supported by the terminal device, and the capability information is used for the network device to determine whether to configure spatial relationship information of the uplink signal for the terminal device, when the capability information indicates that the beam correspondence is supported by the terminal device, no spatial relationship information of the uplink signal is configured by the network device, and when the capability information indicates that the beam correspondence is not supported by the terminal device, the spatial relationship information of the uplink signal is configured by the network device;
 receive the downlink signal transmitted by the network device; and
 receive the spatial relationship information of the uplink signal configured by the network device when the beam correspondence is not supported by the terminal device, and transmit the uplink signal to the network device according to the spatial relationship information configured by the network device;

wherein the processor is configured to, when the beam correspondence is supported by the terminal device, determine at least one Transmission Configuration Indicator (TCI) state of the downlink signal according to MAC signaling for activating the downlink signal, determine the spatial relationship information of an uplink signal corresponding to the downlink signal according to the at least one TCI state of the downlink signal, and cause the transceiver to transmit the uplink signal to the network device according to the determined spatial relationship information, wherein the TCI state is used by the terminal device to determine a spatial reception parameter of the downlink signal, wherein the downlink signal is a Physical Downlink Shared Channel (PDSCH), and the uplink signal corresponding to the downlink signal is a Physical Uplink Control Channel (PUCCH), and the PUCCH is used to carry acknowledgment/negative-acknowledgment (ACK/NACK) information of the PDSCH, wherein the at least one TCI state comprises a Synchronization Signal Block (SSB) index, and the SSB index is used by the terminal device to determine the spatial reception parameter of the downlink signal, and wherein in a case where the terminal device receives a first PDSCH at a first time and a second PDSCH at a second time later than the first time, the terminal transmits the ACK/NACK feedback information of the first PDSCH and the second PDSCH in one PUCCH, and determines the spatial relationship information of the one PUCCH according to the at least one TCI state of the second PDSCH.

7. The terminal device according to claim 6, wherein the spatial relationship information comprises a beam and/or an antenna panel used for transmitting the uplink signal corresponding to the downlink signal.

8. The terminal device according to claim 6, wherein the spatial relationship information is a beam and/or an antenna panel used for transmitting the uplink signal corresponding to the downlink signal, and the processor is further configured to:
 determine the beam used for receiving an SSB corresponding to the SSB index, as the beam for transmitting the uplink signal corresponding to the downlink signal; and/or
 determine the antenna panel used for receiving SSB corresponding to the SSB index, as the antenna panel for transmitting the uplink signal corresponding to the downlink signal.

9. The terminal device according to claim 6, wherein the processor is further configured to:
 determine the spatial relationship information of the uplink signal corresponding to the downlink signal according to a first TCI state in the at least one TCI state.

10. The terminal device according to claim 9, wherein the first TCI state is any one of the following:

a first one of the at least one TCI state;

a second one of the at least one TCI state;

the TCI state including an SSB index in the at least one TCI state;

the TCI state corresponding to a first demodulation reference signal (DMRS) port group in the at least one TCI state;

the TCI state corresponding to a second DMRS port group in the at least one TCI state;

the TCI state including a first Phase Tracking Reference Signal (PTRS) port in the at least one TCI state; or the TCI state including a second PTRS port in the at least one TCI state.

11. A non-transitory computer-readable storage medium for storing a computer program that causes a terminal device to perform a process comprising:
 sending, by the terminal device to a network device, capability information of the terminal device, wherein the capability information of the terminal device indicates whether a beam correspondence between a beam used for receiving a downlink signal and a beam used for transmitting an uplink signal corresponding to the downlink signal is supported by the terminal device, and the capability information is used for the network device to determine whether to configure spatial relationship information of the uplink signal for the terminal device, when the capability information indicates that the beam correspondence is supported by the terminal device, no spatial relationship information of the uplink signal is configured by the network device, and when the capability information indicates that the beam correspondence is not supported by the terminal device, the spatial relationship information of the uplink signal is configured by the network device;
 receiving the downlink signal transmitted by the network device;
 when the beam correspondence is not supported by the terminal device, receiving, by the terminal device, the spatial relationship information of the uplink signal configured by the network device, and transmitting, by the terminal device, the uplink signal to the network device according to the spatial relationship information configured by the network device; and when the beam correspondence is supported by the terminal device, determining, by the terminal device, at least one Transmission Configuration Indicator (TCI) state of the downlink signal according to MAC signaling for activating the downlink signal, determining, by the terminal device, the spatial relationship information of the uplink signal corresponding to the downlink signal according to the at least one TCI state of the downlink signal, and transmitting, by the terminal device, the uplink signal to the network device according to the determined spatial relationship information, wherein the TCI state is used by the terminal device to determine a spatial reception parameter of the downlink signal;

wherein the downlink signal is a Physical Downlink Shared Channel (PDSCH), and the uplink signal corresponding to the downlink signal is a Physical Uplink Control Channel (PUCCH), and the PUCCH is used to carry acknowledgment/negative-acknowledgment (ACK/NACK) information of the PDSCH, wherein the at least one TCI state comprises a Synchronization Signal Block (SSB) index, and the SSB index is used by the terminal device to determine the spatial reception parameter of the downlink signal, and wherein in a case where the terminal device receives a first PDSCH at a first time and a second PDSCH at a second time later than the first time, the terminal transmits the ACK/NACK feedback information of the first PDSCH and the second PDSCH in one PUCCH, and determines the spatial relationship information of the one PUCCH according to the at least one TCI state of the second PDSCH.

* * * * *